United States Patent [19]

Shumaker

[11] Patent Number: 5,566,034
[45] Date of Patent: Oct. 15, 1996

[54] OFF-TRACK DETECTION WITH CHARGE REDISTRIBUTION A/D CIRCUITS

[75] Inventor: Wayne G. Shumaker, Westborough, Mass.

[73] Assignee: Quantum Corporation, Milpitas, Calif.

[21] Appl. No.: 253,463

[22] Filed: Jun. 3, 1994

[51] Int. Cl.[6] .................................................. G11B 5/596
[52] U.S. Cl. ..................................... 360/77.04; 360/77.08; 327/58; 327/60
[58] Field of Search ........................... 360/77.04, 77.08, 360/77.07; 327/58, 60, 91, 94, 403

[56] References Cited

U.S. PATENT DOCUMENTS

| | | | |
|---|---|---|---|
| 3,864,741 | 2/1975 | Schwarz | 360/77.08 |
| 4,163,265 | 7/1979 | van Herk et al. | 360/77.08 |
| 4,415,882 | 11/1983 | Akazawa et al. | 340/347 AD |
| 4,472,750 | 9/1984 | Klumpp et al. | 360/78 |
| 4,498,129 | 2/1985 | Velazquez | 364/174 |
| 4,646,175 | 2/1987 | Sokolik et al. | 360/78 |
| 4,737,869 | 4/1988 | Sugaya et al. | 360/77.08 |
| 4,977,470 | 12/1990 | Murayama et al. | 360/77.08 |
| 5,194,798 | 3/1993 | Hashimoto et al. | 318/594 |
| 5,381,281 | 1/1995 | Shrinkle et al. | 360/77.08 |
| 5,416,432 | 5/1995 | Lewis et al. | 360/75 |

*Primary Examiner*—W. Chris Kim
*Assistant Examiner*—Regina Y. Neal
*Attorney, Agent, or Firm*—David B. Harrison; Debra A. Chun

[57] ABSTRACT

An apparatus for detecting off-track positioning of a disk read/write head seeking a selected data track on a disk having data tracks with embedded servo burst patterns recorded thereon. The apparatus comprises a compare and select component, a charge redistribution A/D converter circuit and an off-track controller. The compare and select component compares and selects from among voltage values corresponding to the servo bursts a pair best representing track centerline as a first servo signal and a second servo signal and determines which of the servo signals is greater. The charge redistribution analog-to-digital (A/D) converter circuit determines if the normalized track position exceeds a position threshold representing a percentage of the normalized track position distinguishing on-track from off-track position through the use of an internal binary-weighted, switched capacitor array DAC and a comparator. The DAC receives as inputs the first servo signal and the second servo signal and has an array of binary-weighted, switched capacitors, which is configured according to a position threshold-related value. The binary value of the position threshold is supplied by the off-track controller. Based on the output of the DAC, the comparator determines whether or not an off-track condition has occurred. Once an off-track condition has been detected, the off-track controller generates an off-track position error signal in response to the comparator output when indicative of an off-track condition.

14 Claims, 6 Drawing Sheets

| A>C | B>D | Digitize |
|---|---|---|
| 0 | 0 | C−D off-track ⎯a |
| 0 | 1 | B−C ⎫ b |
| 1 | 0 | D−A ⎭ |
| 1 | 1 | A−B off-track ⎯a |

*FIG. 6*

| | Case 1 | Case 2 | | Position Threshold−Related Value |
|---|---|---|---|---|
| ADIN <0> | −Y | −X | * | $(I+T)/2$ |
| ADIN <1> | +X | +Y | * | $(I-T)/2$ |
| ADIN <2> | +Y | +X | * | $(I+T)/2$ |
| ADIN <3> | −X | −Y | * | $(I-T)/2$ |

Where X = A or C
Y = B or D

OFF-TRACK DETECTION WITH CHARGE REDISTRIBUTION A/D CIRCUITS

FIELD OF THE INVENTION

The invention relates generally to the field of embedded servo positioning systems for use in a disk drive, and in particular, to an improved apparatus within an embedded servo positioning system for performing off-track position detection and error generation.

BACKGROUND OF THE INVENTION

In a conventional embedded servo positioning system of a disk drive, the detection of off-track positioning of a read/write head may involve converting position bursts of a filtered, differential disk drive read signal into a normalized voltage level output proportional to the relative head/disk position. Typically, the generation of this normalized position error signal and off-track position detection requires the use of servo off-track detection circuitry which is distinct from the existing servo track position detection circuitry. This circuitry may include compare and select circuits to determine servo burst selections, a programmable DAC to set a predetermined threshold level defining the boundary between on-track and off-track position, sum and difference amplifiers to form the sum and difference signals of the normalized signal and a high resolution comparator to compare the normalized analog signal to the reference or threshold level. The result of this comparison produces a logic output which determines if the relative head/disk position exceeds the threshold level. This logic output signal may then be used to gate writes to the disk.

The primary disadvantage associated with such an approach is that the additional circuits or devices required for off-track position detection increase the size, complexity and power consumption of the track position detection circuitry while disk drive design objectives continue to target improved performance and smaller form factors.

A need, therefore, exists to provide an improved apparatus for off-track position detection that utilizes existing types of track position detection circuits having charge redistribution A/D circuits. It is desirable to allow these charge redistribution A/D circuits already used by a disk drive control system to digitize the normalized burst signals for servo tracking to also perform the off-track position detection function.

SUMMARY OF THE INVENTION

It is an object of the present invention to provide an improved apparatus for detecting the off-track position of a read/write head of disk drive system having an embedded servo.

It is a further object to provide an off-track detection apparatus that uses existing types of servo track position detection circuitry for off-track position detection.

In a broad sense, the above and other objectives are attained by an off-track position detection apparatus which implements an off-track position detection technique utilizing a compare and select component and a charge redistribution analog-to-digital converter (ADC) circuit of existing types of servo track position detection circuitry, in conjunction with an off-track controller. The compare and select component selects a pair of position bursts best representative of track centerline as servo signals. The servo signals are input to the charge redistribution A/D converter circuit, which compares normalized track position to a predetermined position threshold representing a percentage of the normalized track position that distinguishes on-track from off-track position. The charge redistribution A/D converter circuit includes a binary-weighted, switched capacitor array DAC configured according to a position threshold-related value, and a comparator for determining whether or not an off-track condition exists. The off-track controller provides a binary value of the position threshold to the ADC circuit. The off-track controller also generates an off-track position error signal in response to the output of the comparator of the ADC circuit when the output indicates the existence of an off-track condition.

The apparatus of the present invention offers several advantages over the prior art. By using charge redistribution A/D circuits of existing types of the servo track position detection circuitry to perform off-track detection, the need for a programmable DAC to set the threshold and separate comparator for comparing the normalized signal to that threshold can be eliminated from the design. Further, the additional sum and difference amplifiers used by the prior art solution to generate the normalized signal are bypassed.

These changes have the desired effect of improving performance and, subsequently, format efficiency, as well as reducing power consumption. In addition, the utilization of the switched capacitor array circuits of the A/D converter's internal DAC for this function allows for simple auto-zeroing, thus giving improved resolutions, and further reduces power consumption over the prior continuous current approach.

BRIEF DESCRIPTION OF THE DRAWINGS

The above objects, features and advantages of the present invention will become more apparent from the following detailed description taken in conjunction with the accompanying drawings, in which.

DESCRIPTION OF THE PREFERRED EMBODIMENT

Figure 1:
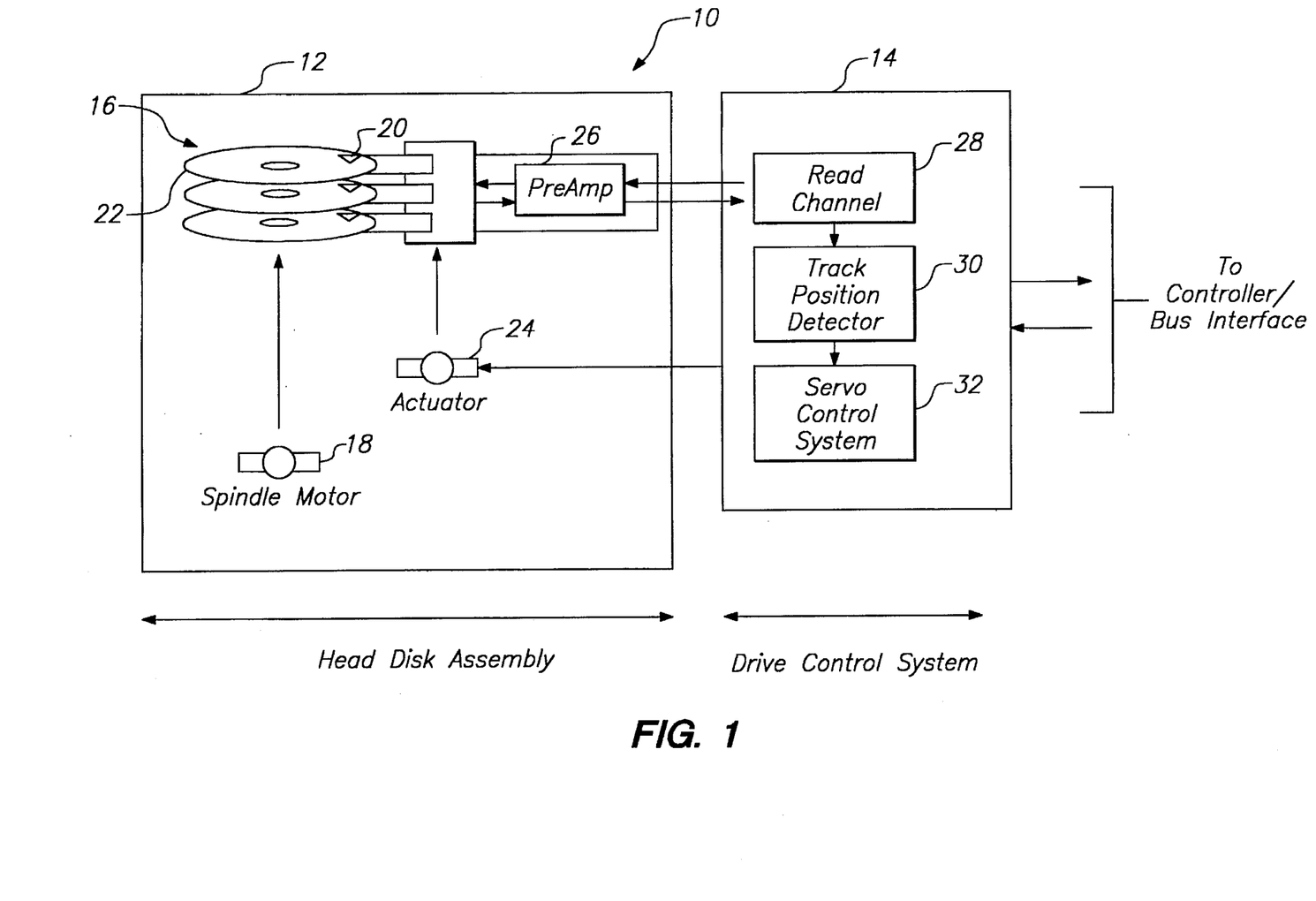
FIG. 1 is a general block diagram of a disk drive system having a head disk assembly and a disk control system, which includes a read channel, a servo control system and a track position detector according to the present invention.
Figure 2:
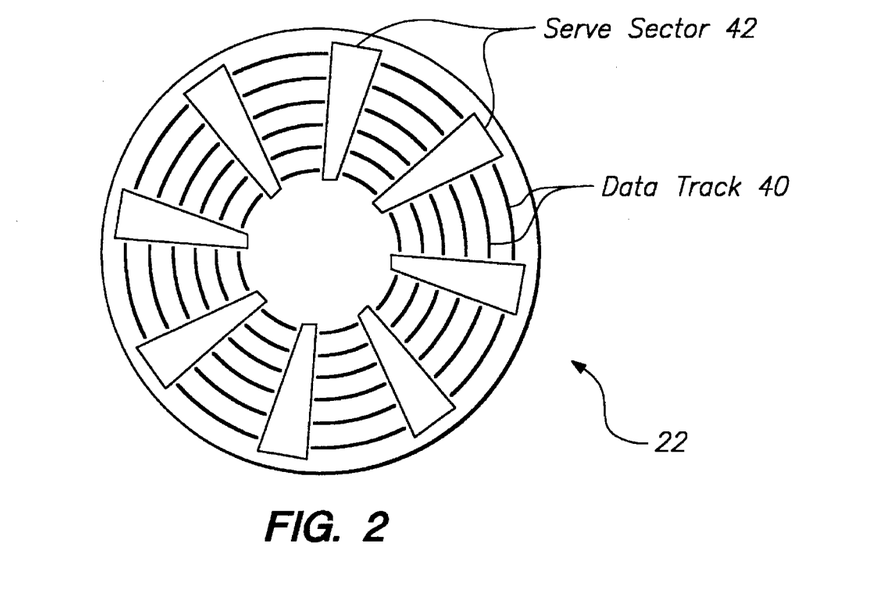
FIG. 2 is a plan view of a disk surface partitioned radially into data tracks, which are divided circumferentially by servo sectors.

As shown in FIG. 1, a conventional disk drive system 10 includes a head disk assembly 12 and a drive control system 14. The disk drive system may be of the floppy, or removable media type, or it may be a fixed disk drive. Referring to the fixed disk drive system 10 in FIG. 1, the head disk assembly 12 includes an arrangement of disks 16 fixed to a spindle hub (not shown) activated to movement by a spindle motor 18, a read/write head 20 for seeking data on a given disk 22, an actuator 24 for positioning the read/write head 20 and a pre-amp interface 26. The drive control system 14 includes a read channel 28, a track position detector 30 and a servo control system 32. The surface of each disk 22 of the disk arrangement 16 is partitioned radially into data tracks 40 and the data tracks are divided circumferentially by servo sectors 42 as shown in FIG. 2. In a disk drive system employing "embedded servo", the servo sectors will store pre-recorded positioning servo burst patterns used by the drive's track position detector to find track centerline. The signals that are sent to the read channel from the pre-amp interface will include this embedded servo position information as well as data.

Figure 3:
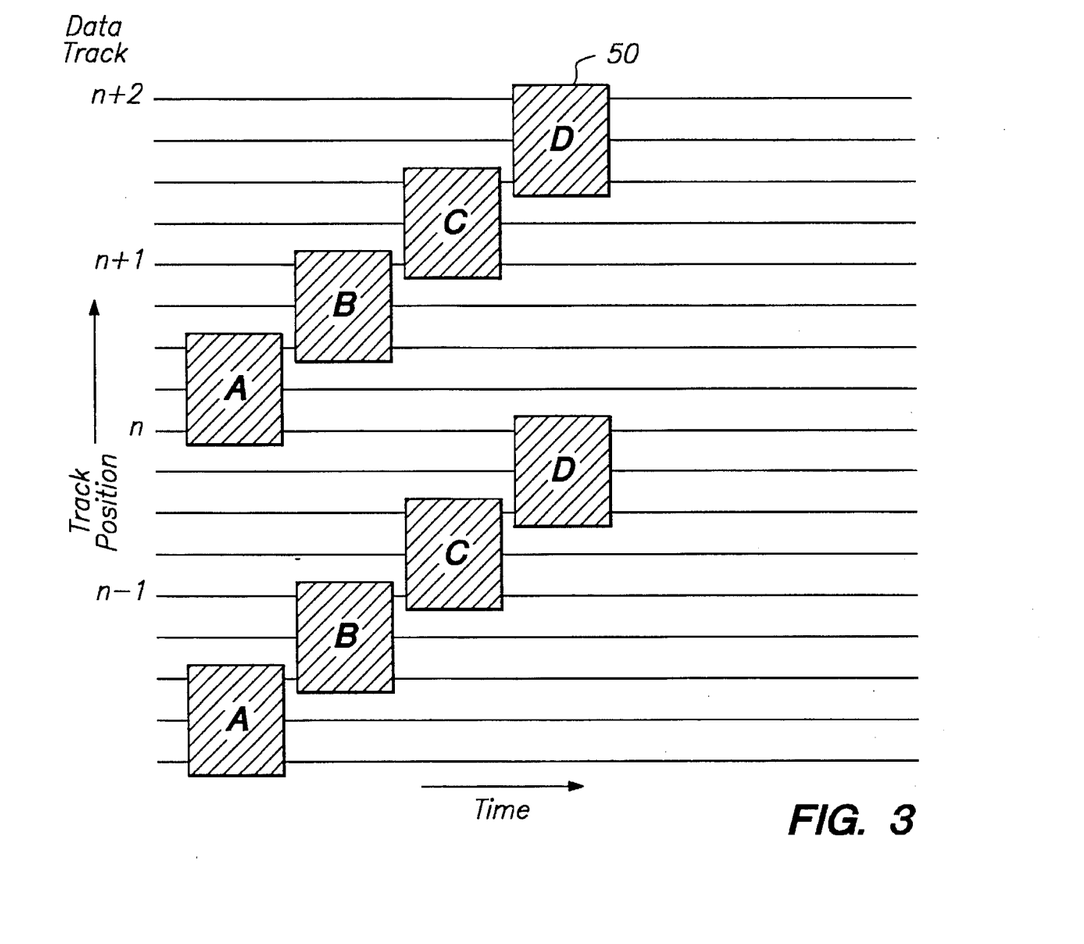
FIG. 3 is an illustrative diagram of an embedded servo burst pattern having a quadrature burst format.

As shown in the drawings, the format of the servo burst pattern is a quadrature burst pattern and the subsequent descriptions will pertain to such; however, the invention is not limited to quad-bursts, but may also apply to other burst patterns (eg. hex burst pattern). FIG. 3 illustrates a particular quadrature burst pattern format disposed over data tracks (n−1, n, n+1 . . . ) with respect to time. As shown, each of four position servo bursts 50, designated as A, B, C and D respectively, are one head width or 70% of the track width wide, although this width as well as the placement of the bursts 50 may be varied.

Each position servo burst 50 is disposed sequentially with respect to one another and reproduced with an amplitude proportional to the degree of coincidence radially between the burst pattern. A pair of laterally-offset bursts are positioned on opposite sides of a any given track. The burst pair will be equal in amplitude when the head is precisely aligned with the track centerline. As the head moves away from the track centerline, a higher amplitude will be detected for the signals reproduced from the particular servo position burst over which the head is more fully aligned. Hence, the amplitudes of the recovered burst signals will be proportional to the radial displacement of the head from track centerline. Consequently, the magnitudes of two selected burst signals can be compared and the absolute value of their difference normalized to develop a position offset value. The position offset value can then be provided to the servo control system 32 (see FIG. 1), and also used to detect an off-track condition in accordance with the present invention.

Figure 4:
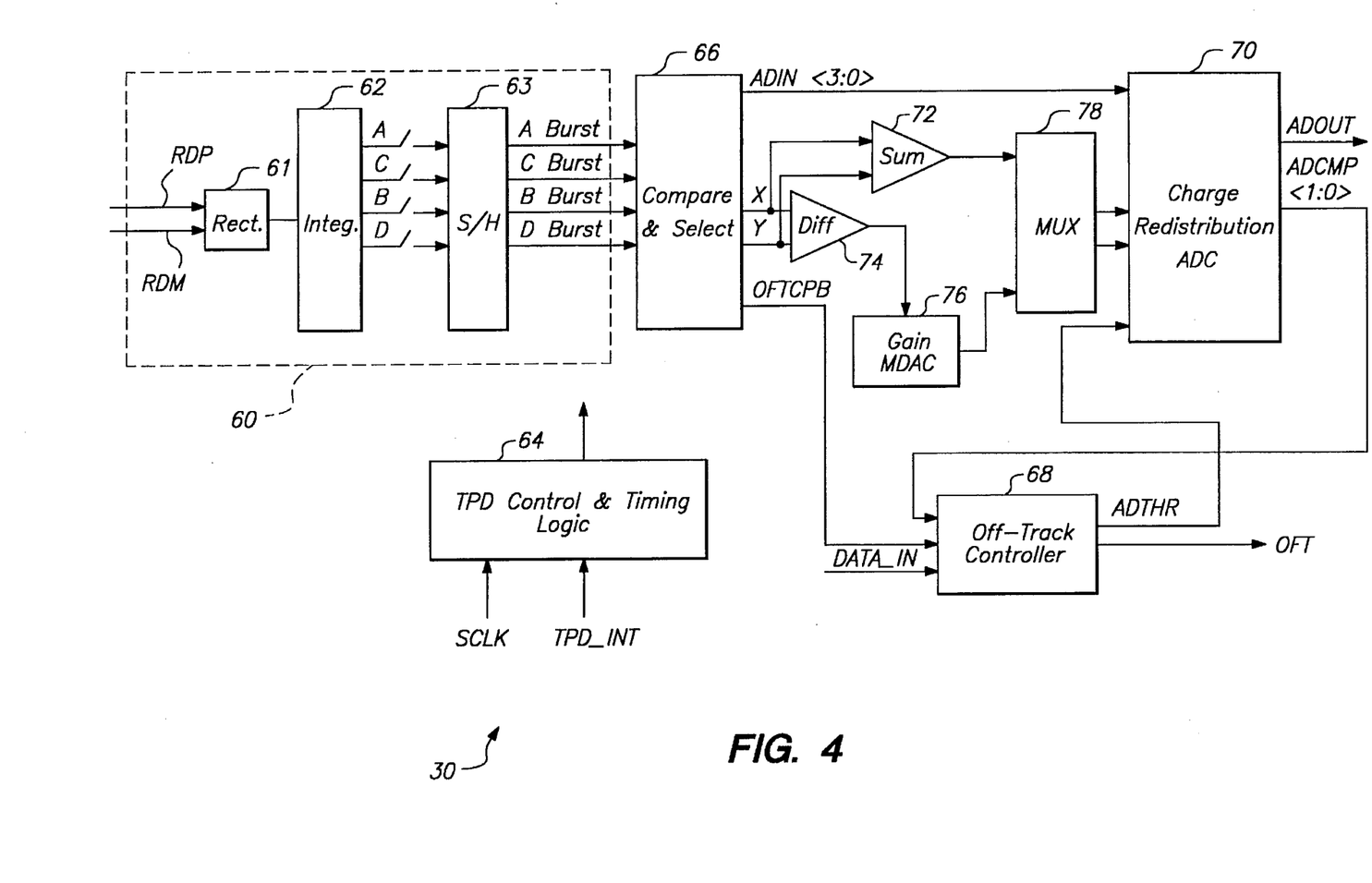
FIG. 4 is a functional block diagram of the track position detector shown in FIG. 1.
Figure 5:
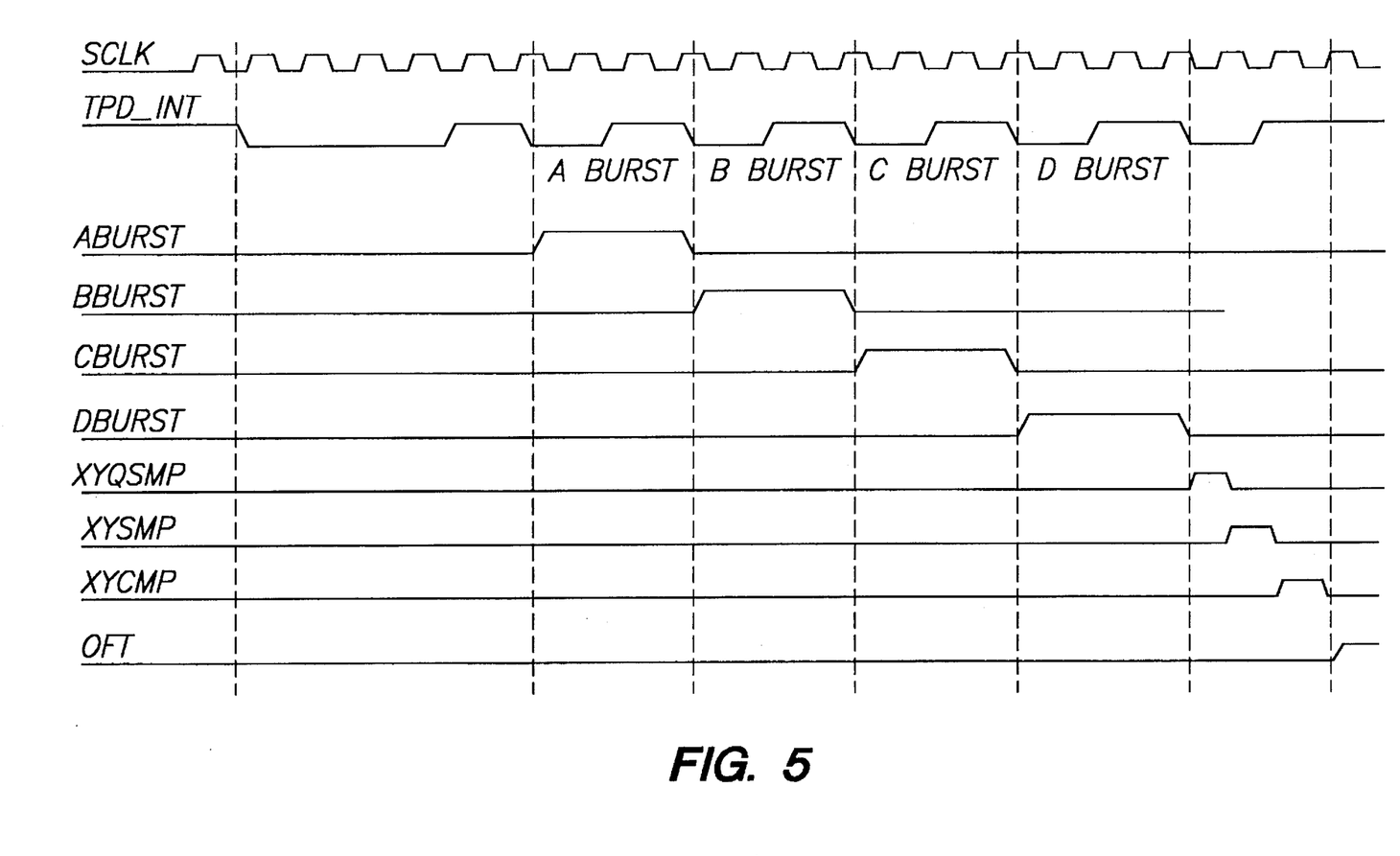
FIG. 5 is a timing diagram of the off-track detection signals as used by the track position detector of FIG. 4 according to the present invention.

Referring now to FIG. 4, a filtered, differential servo burst read signal (RDP, RDM) as reproduced by the read channel of FIG. 1 is received by burst magnitude generating component 60 of the track position detector 30. As shown, the burst magnitude generating component 60 may be implemented with a rectifier 61, an integrator circuit element 62 and a sample-and-hold circuit 63. With the burst magnitude generating component 60, the read signal (RDP, RDM) is rectified and integrated over each burst by the rectifier 61 and the integrator circuit element 62 respectively as shown in FIG. 4. The sample-and-hold circuit 63 captures the magnitudes of the A, B, C and D bursts output from the integrator circuit element 62 on successive edges (high-to-low transitions) of input control signal TPD_INT of TPD control and timing logic element 64, according to the timing in FIG. 5. Other control signals, some of which are illustrated in FIG. 5, are derived from a serial port clock SCLK and used throughout the track position detector 30. It is the TPD_INT control signal that defines the four servo bursts of the quadrature servo burst pattern as shown in FIG. 5. After the last burst is received by the sample-and-hold circuit 63, the servo position value computation and off-track computation/detection is initiated by control signal TDP_INT. Referring again to FIG. 4, the off-track computation and detection operations are performed by a compare and select component 66, an off-track controller 68 and a charge redistribution A/D converter circuit 70. In accordance with the principles of the invention, the charge redistribution A/D converter circuit 70 is used for the off-track computation/detection operations as well as for the servo position value computations, which produce a normalized 8-bit servo value, and track position data conversions. Other elements shown in FIG. 4—sum amplifier 72, difference amplifier 74, gain MDAC 76, MUX 78 and ADC data output signal ADOUT—do not pertain to the present invention, but are included in the figure merely to illustrate one embodiment of the remaining portion of the track position detector 30 used to perform the servo position value computations.

Figure 6:
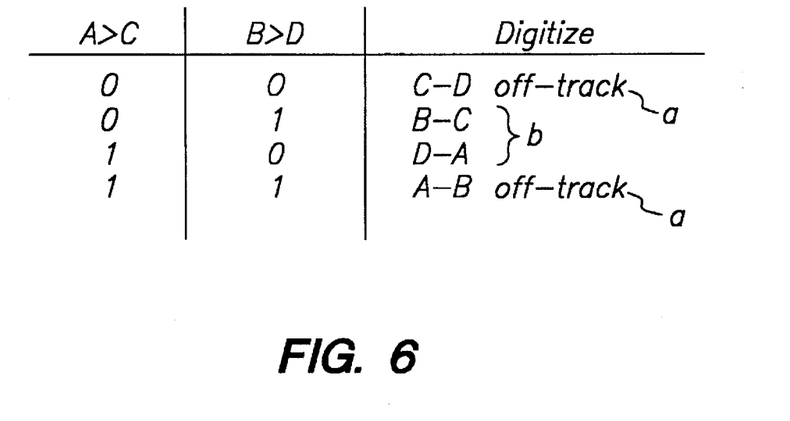
FIG. 6 is a logic table for determining which pair of the servo bursts depicted in FIG. 3 will be the servo signals to be digitized for servo tracking.

The off-track computation and detection performed by the track position detector 30 will now be described in further detail. The off-track computation is performed by the compare and select component 66 and the charge redistribution A/D converter circuit 70. Assuming the servo burst pattern format shown in FIG. 3, the compare and select component 66 will compare voltage values corresponding to the four bursts received from the sample and hold circuit 63 in FIG. 4 and initially select the voltage values for an appropriate pair of servo bursts. This selection is made according to the logic table in FIG. 6 and controlled by the timing of control signal XYQSMP in FIG. 5. Once the appropriate pair of signals—those best representing track centerline—have been selected as a first and a second servo signal, X and Y respectively, the off-track condition is computed. According to the table of FIG. 6, where (C>A and D>B) or (A>C and B>D), an off-track condition "a" is assumed and a position error signal OFT is asserted via the OFTCPB signal input to the off-track controller 68. Otherwise, where A>C, then servo signals X=A, Y=D, else X=C, Y=B. For the latter condition "b", the normalized track position equation |X−Y|/X+Y>T[1], where T is a percentage of normalized track position and represents a boundary between on-track and off-track position, is solved for the off-track condition by the charge redistribution A/D converter circuit 70 using the following derivation and cases:

| Case 1: For X > Y | Case 2: For Y > X |
|---|---|
| X − Y > T(X + Y) | Y − X > T(X + Y) |
| (1 − T)/2*X − (1 + T)/ 2*Y > 0 | (1 − T)/2*Y − (1 + T)/ 2*X > 0 [2] |

This derivation is key to the use of the charge redistribution A/D converter circuit 70 for solving the position equation, as (1−T)/2 is the compliment of (1+T)/2 in its internal switched capacitor array.

In the above equation [2], T may be one value T1 for Case 1 and another value T2 for Case 2. T1=T2 is the norm, but different T1 and T2 values allow for some offset in the servo track center, the offset not exceeding ½ track for quad-bursts.

Figure 7:
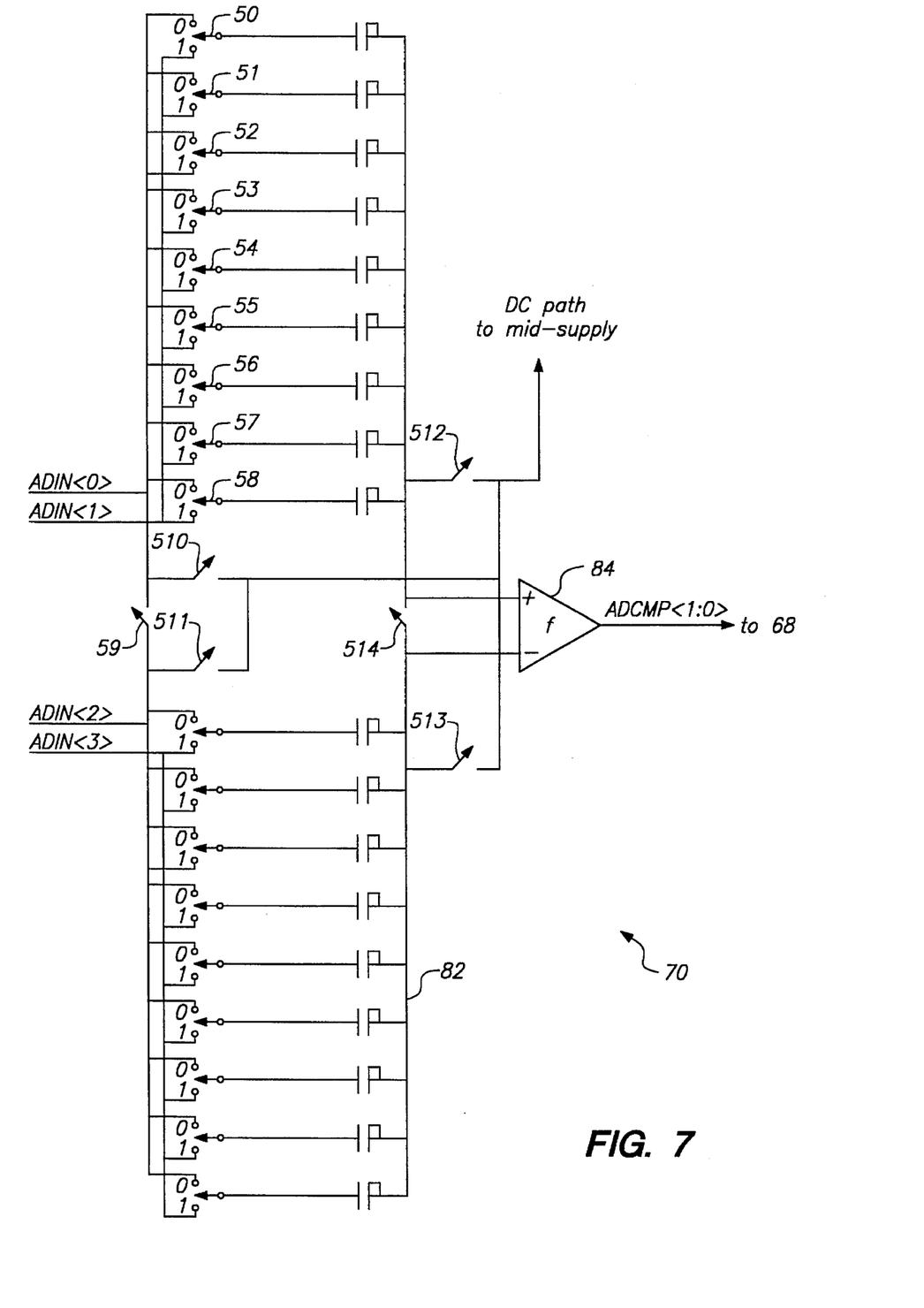
FIG. 7 is a circuit diagram of the charge redistribution A/D converter circuit shown in FIG. 4.

The charge redistribution A/D converter circuit 70 used to solve the above equation [2] is arranged as shown in FIG. 7 and the principle of its operation as it relates to the invention will be described. The ADC circuitry of FIG. 7 includes a DAC 82 having an array of binary-weighted, switched capacitors and a comparator 84. The four inputs to the capacitor array DAC 82 of the ADC circuit 70 are signals ADIN<3:0> received from the compare and select component 66 of FIG. 4. Note that the ADC illustrated in FIG. 7 is differential. Accordingly, ADIN<2> and ADIN<3> are provided by the compare and select component 66 as complimented inputs to produce the differential circuit.

In performing the off-track detection, the charge redistribution A/D circuit 70 operates—that is, samples and compares—according to a two-phase clock: a first phase (sample) and a second phase (compare). The timing of these phases as controlled by signals XYSMP and XYCMP, which are generated by the TPD control and timing logic element 64 of FIG. 4 and synchronized with SCLK, is illustrated in the timing diagram of FIG. 5.

Figure 8:
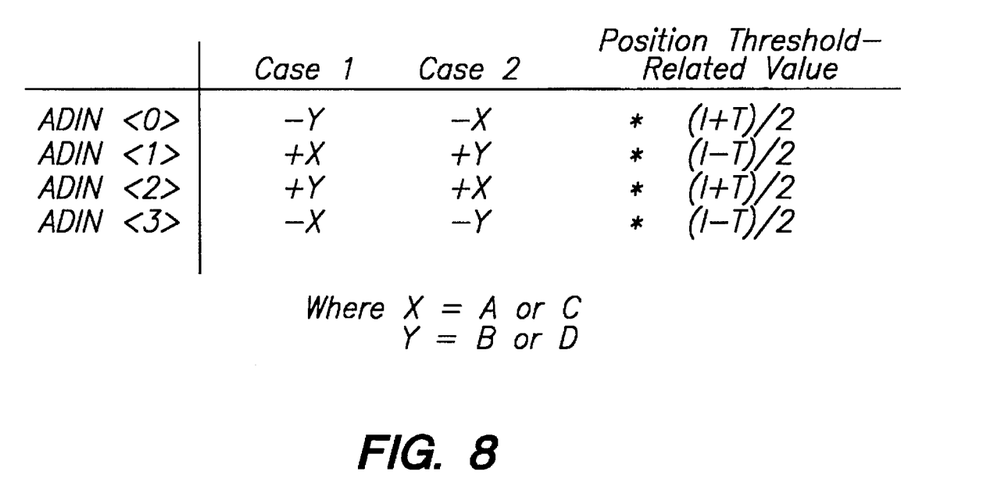
FIG. 8 is a table showing the selection and sampling of the servo signals on the input lines to the ADC circuit of FIG. 7.

As shown in the servo signal selection table of FIG. 8, the four inputs ADIN<3:0> are servo signals $-Y$, $X$, $Y$ and $-X$ respectively for Case 1, or $-X$, $Y$, $X$ and $-Y$ respectively for Case 2, and are sampled during the first phase with position threshold-related values as indicated to solve for each case. Since $(1-T)/2$ is the compliment of $(1+T)/2$ in the binary-weighted capacitor array of the DAC, $X$ [or $Y$] is sampled with $(1-T)/2$ and $-Y$ [or $-X$] with $(1+T)/2$ according to [Eq. 2], where T is again a percentage of normalized track position and a binary value to be used to weight the capacitors of the capacitor array. During the sampling interval, the capacitor array switch S0 is set by a "0" and switch S8 by a "1", representing the '1' in the formula of the position threshold-related values of FIG. 8. The remainder of the capacitor array is weighted based on a binary value of T provided by the off-track controller 68. The binary threshold value is programmed into the off-track controller 68 via data input DATA_IN and then output on ADTHR to the capacitor array switches S1–S7 of the charge redistribution A/D circuit 70 in a manner known in the art and, hence, not shown in FIG. 7. The bits of the binary value for T, corresponding to the capacitor array shown in FIG. 7 as a 7-bit position threshold value, are used to set the individual positions of switches S1–S7 of the binary-weighted, switched capacitor array DAC 82. Accordingly, these switches are set to a "1" or a "0" position based on the binary value of position threshold T. Switches S10–S14 are closed and S9 is open during the first phase. The manner in which these switches are controlled and operated is known in the art and, hence, not shown. Here, switches S10–S14 and switch S9 are responsive to signals XYSMP and XYCMP, respectively.

During the second phase or compare operation, switches S0 and S8 remain as set during the first phase. Switches S1–S7 are set to a "0" position, S9 is closed and S10–S14 are open. As a result, the sampled inputs for either Case 1 or Case 2 are shorted together to form a sum and the sum then provided to the comparator 84 of ADC circuit 70 to compare the result of $(1-T)/2*X - Y*(1+T)/2 > 0$ for Case 1 or, alternately, $Y*(1-T)/2 - X*(1+T)/2 > 0$ for Case 2, for off-track position detection. If the sum is greater than zero, a true output ADCMP<1> is input to the off-track controller 68 of FIG. 4, resulting in the assertion of a position error or off-track signal OFT.

Although the above description has proceeded with reference to a specific embodiment of the invention, the invention is not necessarily limited to the particular embodiment shown herein. It is to be understood that various other adaptations and modifications may be made within the spirit and scope of the invention as set forth by the claims.

What is claimed:

1. An apparatus for detecting off-track positioning of a disk read/write head seeking a selected data track on a disk having data tracks with position servo bursts of embedded servo burst patterns recorded thereon, comprising:

a compare and select component for comparing voltage values corresponding to position servo bursts recovered from the disk and for selecting voltage values for a pair of bursts best representing a track centerline, the selected voltage values designated as a servo signal pair having a first servo signal and a second servo signal, the compare and select component determining, upon selection of the pair, which of the first and second servo signals is a larger servo signal of the pair and which is a smaller servo signal of the pair; and a charge redistribution analog-to-digital (A/D) converter circuit for digitizing the servo signals received from the compare and select component and determining an off-track condition of the disk read/write head when the servo signal pair represents a normalized track position greater than a predetermined position threshold, the charge redistribution A/D converter circuit determining the off-track condition by sampling the larger servo signal with a first value equal to one minus the position threshold to produce a sampled larger servo signal, and sampling the smaller servo signal with a second value equal to one plus the position threshold to produce a sampled smaller servo signal, the charge redistribution A/D converter circuit including a comparator for comparing the sampled larger servo signal with the sampled smaller servo signal to determine if the sampled larger servo signal is greater than zero.

2. An apparatus according to claim 1, wherein the charge redistribution A/D converter circuit is a differential circuit which comprises:

a DAC and the comparator, the DAC for receiving from the compare and select component the first servo signal and the second servo signal as a negative first input and a positive second input respectively where the second servo signal is determined to be the larger servo signal, or the first servo signal and the second servo signal as the positive second input and the negative first input respectively where the first servo signal is determined to be the larger servo signal, the DAC also receiving from the compare and select component the servo signals as a positive third input and a negative fourth input such that the third input is a differential input being the compliment of the first input and the fourth input is a differential input being the compliment of the second input, the DAC having an array of binary-weighted switched capacitors, the inputs being sampled with a sampling value according to a configuration of the array during a first clocking phase, the sampling value equal to the second value for the negative first input and the positive third input, and the first value for the positive second input and the negative fourth input, the position threshold of the first and second values being represented as a binary number provided to the array, the inputs then summed during a second clocking phase, the comparator for receiving from the DAC during the second clocking phase the sum of the sampled inputs and for comparing the sum to zero, the comparator producing a logic output for indicating an off-track condition has been detected when the sum is greater than zero.

3. An apparatus for detecting off-track positioning of a disk read/write head seeking a selected data track on a disk having data tracks with position servo bursts of embedded servo burst patterns recorded thereon, comprising:

a compare and select component for comparing voltage values corresponding to the position servo bursts recovered from the disk and for selecting voltage values for a pair of the bursts best representing a track centerline, the selected voltage values designated as a servo signal pair having a first servo signal and a second servo signal, the compare and select component determining, upon selection of the pair, which of the first and second servo signals is a larger servo signal of the pair and which is a smaller servo signal of the pair; and a charge redistribution analog-to-digital (A/D) converter circuit for digitizing the servo signals and determining an off-track condition of the disk read/write head when the servo signal pair represents a normalized track position greater than a predetermined position threshold, the charge redistribution A/D converter circuit having a DAC and a comparator, the DAC for receiving from the compare and select component the first servo signal and the second servo signal as a negative first input and a positive second input respectively when the second servo signal is determined to be the larger servo signal, or the first servo signal and the second servo signal as the positive second input and the negative first input respectively when the first servo signal is determined to be the larger servo signal, the DAC also receiving from the compare and select component the servo signals as a positive third input and a negative fourth input such that the third input is a differential input being the compliment of the first input and the fourth input is a differential input being the compliment of the second input, the DAC having an array of binary-weighted switched capacitors, the inputs of the DAC being sampled with a position threshold-related value according to a configuration of the array during a first clocking phase to produce sampled inputs, the sampled inputs then summed during a second clocking phase, the comparator for receiving from the DAC during the second clocking phase the sum of the sampled inputs and for comparing the sum to zero, the comparator producing a logic output for indicating [an] the off-track condition has been detected when the sum is greater than zero.

4. An apparatus according to claim 3 wherein the position threshold-related value is equal to one plus the position threshold for the negative first input and positive third input, and one minus the position threshold for the positive second input and negative fourth input, the position threshold being represented as a binary number.

5. An apparatus according to claim 2 further comprising:

an off-track controller for supplying the binary number representing the position threshold to the array of binary-weighted switched capacitors of the DAC.

6. An apparatus according to claim 2 further comprising:

an off-track controller for generating an off-track position error signal in response to the logic output of the comparator of the charge redistribution A/D converter circuit when the logic output indicates an off-track condition.

7. An apparatus according to claim 2 comprising:

an off-track controller for supplying the binary number representing the position threshold to the array of binary-weighted switched capacitors of the DAC and for generating an off-track position error signal in response to the comparator of the charge redistribution A/D converter circuit when the logic output indicates an off-track condition.

8. An apparatus according to claim 4 comprising:

an off-track controller for supplying the binary number representing the position threshold to the array of binary-weighted switched capacitors of the DAC and for generating an off-track position error signal in response to the comparator of the charge redistribution A/D converter circuit when the logic output indicates an off-track condition.

9. An apparatus according to claim 1 wherein the embedded servo burst pattern is a quadrature servo burst pattern having a first, second, third and fourth burst, and the compare and select component compares the voltage values corresponding to the first, second, third and fourth bursts such that, if the voltage value of the third burst is greater than the voltage of the first burst and the voltage of the fourth burst is greater than the voltage value of the second burst, or the voltage value of the first burst is greater than the voltage value of the third burst and the voltage value of the second burst is greater than the voltage value of the fourth burst, an off-track condition is assumed, the compare and select component then compares the voltage values corresponding to the first burst and third burst when an off-track condition is not assumed such that, if the voltage value of the first burst is greater than the voltage value of the third burst, the voltage value of the first burst is selected as the first servo signal and the voltage value of the fourth burst is selected as the second servo signal or the voltage value of the third burst is selected as the first servo signal and the voltage value of the second burst is selected as the second servo value.

10. An apparatus according to claim 2 wherein the embedded servo burst pattern is a quadrature servo burst pattern having a first, second, third and fourth burst, and the compare and select component compares the voltage values corresponding to the first, second, third and fourth bursts such that, if the voltage value of the third burst is greater than the voltage of the first burst and the voltage of the fourth burst is greater than the voltage value of the second burst, or the voltage value of the first burst is greater than the voltage value of the third burst and the voltage value of the second burst is greater than the voltage value of the fourth burst, an off-track condition is assumed, the compare and select component then compares the voltage values corresponding to the first burst and third burst when an off-track condition is not assumed such that, if the voltage value of the first burst is greater than the voltage value of the third burst, the voltage value of the first burst is selected as the first servo signal and the voltage value of the fourth burst is selected as the second servo signal or the voltage value of the third burst is selected as the first servo signal and the voltage value of the second burst is selected as the second servo value.

11. An apparatus according to claim 10 wherein the compare and select component produces an off-track compare output signal when the off-track condition is assumed.

12. An apparatus according to claim 11 comprising:

an off-track controller for supplying the binary number representing the position threshold to the array of binary-weighted switched capacitors of the DAC and for generating an off-track position error signal in response to the off-track compare output signal of the compare and select component and in response to the comparator of the charge redistribution A/D converter circuit when the logic output indicates an off-track condition.

13. An apparatus according to claim 1 wherein the position threshold is a first position threshold when the first servo signal is the larger servo signal and a second position threshold when the second servo signal is the larger servo signal to allow for an offset in the track centerline.

14. An apparatus according to claim 9 wherein the position threshold is a first position threshold when the first servo signal is the larger servo signal and a second position threshold when the second servo signal is the larger servo signal to allow for an offset in the track centerline, the offset not exceeding one-half of a track width.

* * * * *